(12) United States Patent
Liberman

(10) Patent No.: US 6,638,217 B1
(45) Date of Patent: Oct. 28, 2003

(54) APPARATUS AND METHODS FOR DETECTING EMOTIONS

(75) Inventor: Amir Liberman, 3 Hatsiporen Street, Gilo, 93859 Jerusalem (IL)

(73) Assignee: Amir Liberman, Jerusalem (IL)

( * ) Notice: Subject to any disclaimer, the term of this patent is extended or adjusted under 35 U.S.C. 154(b) by 0 days.

(21) Appl. No.: 09/581,722

(22) PCT Filed: Dec. 16, 1998

(86) PCT No.: PCT/IL98/00613

§ 371 (c)(1),
(2), (4) Date: Dec. 11, 2000

(87) PCT Pub. No.: WO99/31653

PCT Pub. Date: Jun. 24, 1999

(30) Foreign Application Priority Data

Dec. 16, 1997 (IL) .................................................. 122632

(51) Int. Cl.[7] ............................. A61B 5/00; G10L 21/00
(52) U.S. Cl. ........................ 600/300; 128/920; 704/272
(58) Field of Search ................................ 600/300–301, 600/459; 128/903–904, 920–925; 705/2, 3, 9; 704/272, 200, 200.1, 202

(56) References Cited

U.S. PATENT DOCUMENTS

| | | | |
|---|---|---|---|
| 3,855,418 A | 12/1974 | Fuller | |
| 3,971,034 A | 7/1976 | Bell, Jr. et al. | |
| 4,093,821 A | 6/1978 | Williamson | |
| 5,029,214 A | 7/1991 | Hollander | |
| 5,148,483 A | 9/1992 | Silverman | |
| 5,853,005 A | * 12/1998 | Scanlon | ...................... 600/459 |
| 5,875,427 A | 2/1999 | Yamazaki | |
| 6,055,501 A | * 4/2000 | MacCaughelty | ............ 704/272 |

* cited by examiner

*Primary Examiner*—Max F. Hindenburg
*Assistant Examiner*—Michael Astorino
(74) *Attorney, Agent, or Firm*—Marshall, Gerstein & Borun LLP

(57) ABSTRACT

A method for detecting emotional status of an individual, the method including receiving a speech specimen generated by the individual and deriving therefrom intonation information, and generating an output indication of the individual's emotional status based on the intonation information, wherein the intonation information includes information relating to thorns and wherein the generating step includes computing the individual's excitement level based on the information relating to thorns and generating an output indication of the excitement level, wherein the intonation information also includes information relating to length of plateaus, and wherein the excitement level includes a decreasing function of (a) the number of thorns in at least a portion of the speech specimen and of (b) the diversity of plateau length within the portion.

16 Claims, 12 Drawing Sheets

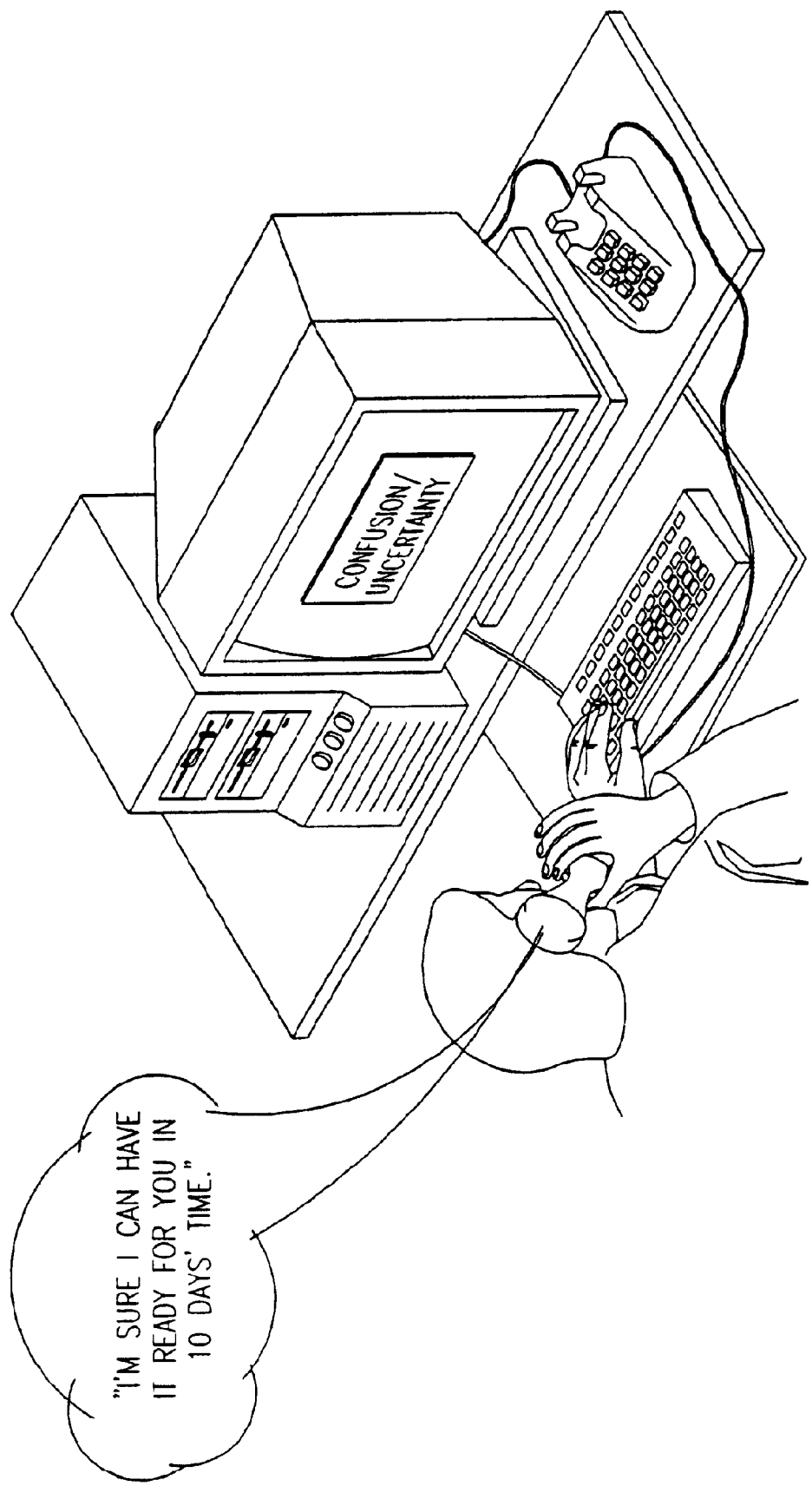

APPARATUS AND METHODS FOR DETECTING EMOTIONS

FIELD OF THE INVENTION

The present invention relates to apparatus and methods for monitoring emotional states.

BACKGROUND OF THE INVENTION

Published PCT Application WO 97/01984 (PCT/IL96/00027) describes a method for effecting biofeedback regulation of at least one physiological variable characteristic of a subject's emotional state, including the steps of monitoring at least one speech parameter characteristic of the subject's emotional state so as to produce an indication signal, and using the indication signal to provide the subject with an indication of the at least one physiological variable. A system permits the method to be carried out in standalone mode or via the telephone line in which case the indication signal may be derived at a location remote from the subject. Information relating to the subject's emotional state can be conveyed vocally to a remote party or textually through the Internet, and then processed as required.

Published European Patent Application No. 94850185.3 (Publication No. 306 664 537 A2) describes a method and arrangement for determining stresses in a spoken sequence. From a sequence recognized in the spoken speech, a model of the speech is created. By comparing the spoken sequence with the modeled speech, a difference between them is obtained.

U.S. Pat. No. 1,384,721 describes a method and apparatus for physiological response analysis.

U.S. Pat. No. 3,855,416 to Fuller describes a method and apparatus for phonation analysis leading to valid truth/lie decisions by fundamental speech-energy weighted vibratto component assessment.

U.S. Pat. No. 3,855,417 to Fuller describes a method and apparatus for phonation analysis lending to valid truth/lie decisions by spectral energy region comparison.

U.S. Pat. No. 3,855,418 to Fuller describes a method and apparatus for phonation analysis lending to valid truth/lie decisions by vibratto component assessment.

The disclosures of all publications mentioned in the specification and of the publications cited therein are hereby incorporated by reference.

SUMMARY OF THE INVENTION

The present invention seeks to provide improved apparatus and methods for monitoring emotional states.

There is thus provided, in accordance with a preferred embodiment of the present invention, apparatus for detecting emotional status of an individual, the apparatus including a voice analyzer operative to input a speech specimen generated by the individual and to derive therefrom intonation information, and an emotion reporter operative to generate an output indication of the individual's emotional status based on the intonation information.

Further in accordance with a preferred embodiment of the present invention, the speech specimen is provided over the telephone to the voice analyzer.

Still further in accordance with a preferred embodiment of the present invention, the report on the individual's emotional status includes a lie detection report based on the individual's emotional status.

Further in accordance with a preferred embodiment of the present invention, the intonation information includes multidimensional intonation information.

Still further in accordance with a preferred embodiment of the present invention, the multidimensional information includes at least 3-dimensional information.

Further in accordance with a preferred embodiment of the present invention, the multidimensional information includes at least 4-dimensional information.

Still further in accordance with a preferred embodiment of the present invention, the intonation information includes information pertaining to thorns.

Further in accordance with a preferred embodiment of the present invention, the information pertaining to thorns includes the number of thorns in a predetermined time period.

Further in accordance with a preferred embodiment of the present invention, the information pertaining to thorns includes the distribution of thorns over time.

Additionally in accordance with a preferred embodiment of the present invention, the intonation information includes information pertaining to plateaus.

Further in accordance with a preferred embodiment of the present invention, the information pertaining to plateaus includes the number of plateaus in a predetermined time period.

Still further in accordance with a preferred embodiment of the present invention, the information pertaining to plateaus includes information pertaining to length of plateaus.

Additionally in accordance with a preferred embodiment of the present invention, the information pertaining to length of plateaus includes an average plateau length for a predetermined time period.

Still further in accordance with a preferred embodiment of the present invention, the information pertaining to length of plateaus includes the standard error of plateau length for a predetermined time period.

Also provided, in accordance with another preferred embodiment of the present invention, is a lie detection system including a multidimensional voice analyzer operative to input a speech specimen generated by an individual and to quantify a plurality of characteristics of the speech specimen, and a credibility evaluator reporter operative to generate an output indication of the individual's credibility, including detection of lies, based on the plurality of quantified characteristics.

Additionally provided, in accordance with another preferred embodiment of the present invention, is a detection method including receiving a speech specimen generated by an individual and quantifying a plurality of characteristics of the speech specimen, and generating an output indication of the individual's credibility, including detection of lies, based on the plurality of quantified characteristics.

Further in accordance with a preferred embodiment of the present invention, the speech specimen includes a main speech wave having a period and wherein the voice analyzer is operative to analyze the speech specimen in order to determine rate of occurrence of plateaus, each plateau indicating that a local relatively low-frequency wave is superimposed onto the main speech wave, and the emotion reporter is operative to provide a suitable output indication based on the rate of occurrence of plateaus. For example, the emotion reporter may provide a suitable output indication when the rate of occurrence of plateaus is found to change.

Similarly, each thorn indicates that a local relatively high-frequency wave is superimposed onto the main speech wave. A particular advantage of analyzing plateaus and thorns as shown and described herein is that substantially all frequencies of the speech wave may be analyzed.

Also provided, in accordance with another preferred embodiment of the present invention, is a method for detecting emotional status and including establishing a multidimensional characteristic range characterizing an individual's range of emotion when at rest by monitoring the individual for a plurality of emotion-related parameters, over a first period during which the individual is in an emotionally neutral state, and defining the multidimensional characteristic range as a function of the range of the plurality of emotion-related parameters during the first period, and monitoring the individual for the plurality of emotion-related parameters, over a second period during which it is desired to detect the individual's emotional status, thereby to obtain a measurement of the plurality of emotion-related parameters, and adjusting the measurement to take into account the range.

Also provided, in accordance with another preferred embodiment of the present invention, is a method for detecting emotional status of an individual, the method including receiving a speech specimen generated by the individual and deriving therefrom intonation information, and generating an output indication of the individual's emotional status based on the intonation information.

BRIEF DESCRIPTION OF THE DRAWINGS

The present invention will be understood and appreciated from the following detailed description, taken in conjunction with the drawings in which:

FIG. 1A is a pictorial illustration of a system for on-line monitoring of a speaker's emotional state.

Attached herewith is the following appendix which aids in the understanding and appreciation of one preferred embodiment of the invention shown and described herein:

Appendix A is a computer listing of a preferred software implementation of a preferred embodiment of the invention shown and described herein.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIG. 1A is a pictorial illustration of a system for on-line monitoring of a speaker's emotional state. As shown, a speech input arriving over a telephone line, in the illustrated embodiment, is received by the system. The system analyzes the speech input in order to obtain an indication of the speaker's emotional state which indication is preferably provided to the user in real time, e.g. on the display screen as shown.

Figure 1B:
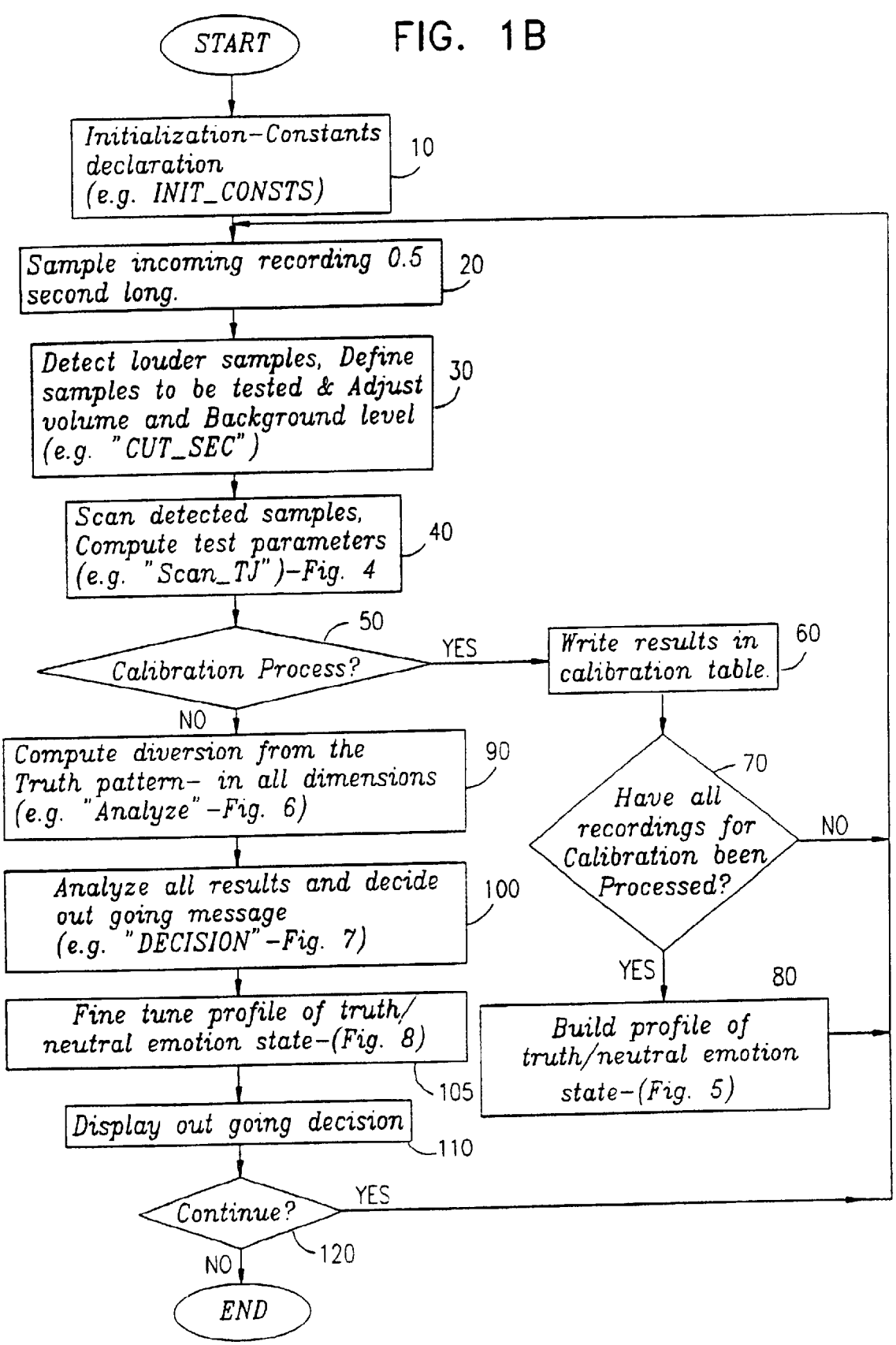
FIG. 1B is a simplified flowchart illustration of a preferred method for on-line monitoring of a speaker's emotional state.

FIG. 1B is a simplified flowchart illustration of a preferred method for on-line monitoring of a speaker's emotional state. The method of FIG. 1B preferably includes the following steps:

Initialization step 10: Constants are defined such as the threshold values of various parameters, defining ranges which are considered to be indicative of various emotions, as described in detail below.

Step 20: Record a voice, periodically or on demand. For example, segments of 0.5 seconds of voice may be recorded continuously, i.e. each 0.5 secs. Alternatively, segments of any other suitable length may be considered which may or may not overlap. For example, adjacent segments may overlap almost entirely, except for one or a few samples.

Digitize the voice recording.

Additionally or alternatively overlapping segments of the recording may be sampled.

Step 30: Analyze voice segment in order to mark the crucial portion of the voice segment, i.e. the portion of the voice segment which is thought to actually contain voice information as opposed to background noise. A suitable criterion for voice information detection is amplitude, e.g. the first instance of amplitude which exceeds a threshold is deemed the beginning of the voice information and the end of the voice information is deemed the point after which no threshold-exceeding sound is found for a predetermined duration.

Preferably, the samples in the crucial portion are normalized e.g. by amplifying the samples to take advantage of the entire range of amplitude which can be accommodated in memory, e.g. +/−127 amplitude units if 8-bit memory is employed.

Step 40: Count thorns and plateaus in the crucial portion. Compute length of each identified plateau, and compute average plateau length for the crucial portion and standard error for the plateau length.

A "thorn" is a notch-shaped feature. For example, the term "thorn" may be defined as:

a. a sequence of 3 adjacent samples in which the first and third samples are both higher than the middle sample, or b. a sequence of 3 adjacent samples in which the first and third samples are both lower than the middle sample.

Preferably, a thorn is declared even if the first and third samples differ only very slightly from the middle sample, i.e.

there is preferably no minimum threshold value for the difference between samples. However, there preferably is a minimum threshold value for the baseline of the thorn, i.e. thorns occurring at very low amplitude are disregarded because they are considered to relate to background noise rather than to voice.

Figure 2:
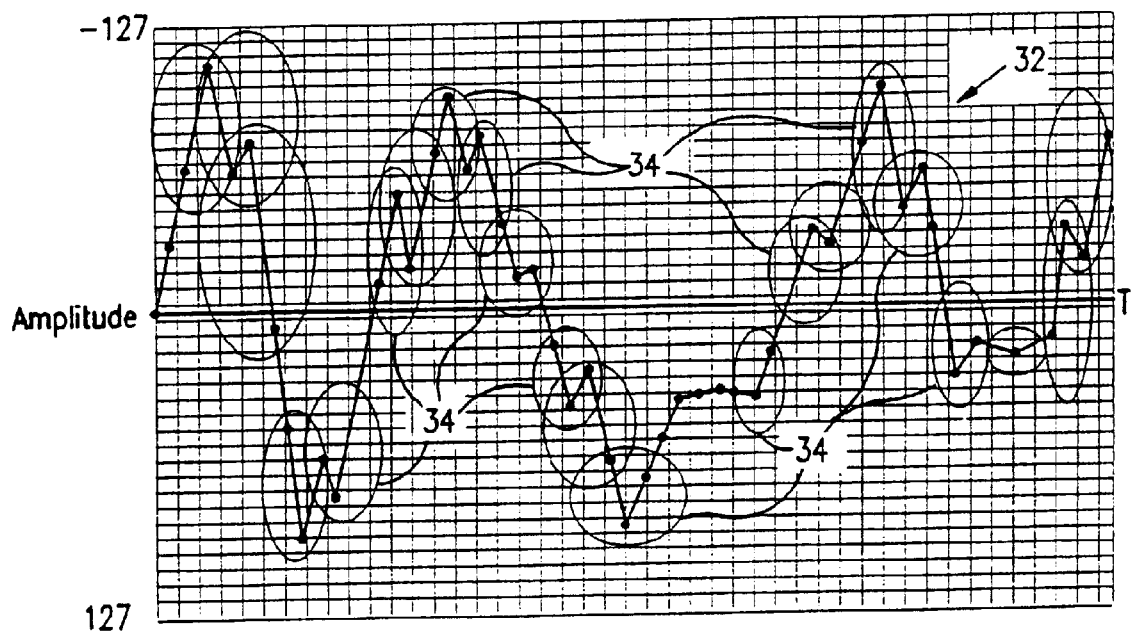
FIG. 2 is a graphic illustration of a voice segment including a number of thorns.

FIG. 2 is a graphic illustration of a voice segment 32, including a number of thorns 34.

A "plateau" is a local flatness in the voice wave. For example, a plateau may be defined as a flat sequence whose length is more than a predetermined minimum threshold and is less than a predetermined maximum threshold. The maximum threshold is required to differentiate local flatness from a period of silence. A sequence may be regarded as flat if the difference in amplitude between consecutive samples is less than a predetermined threshold such as 5 amplitude units if 8-bit memory is employed.

Figure 3:
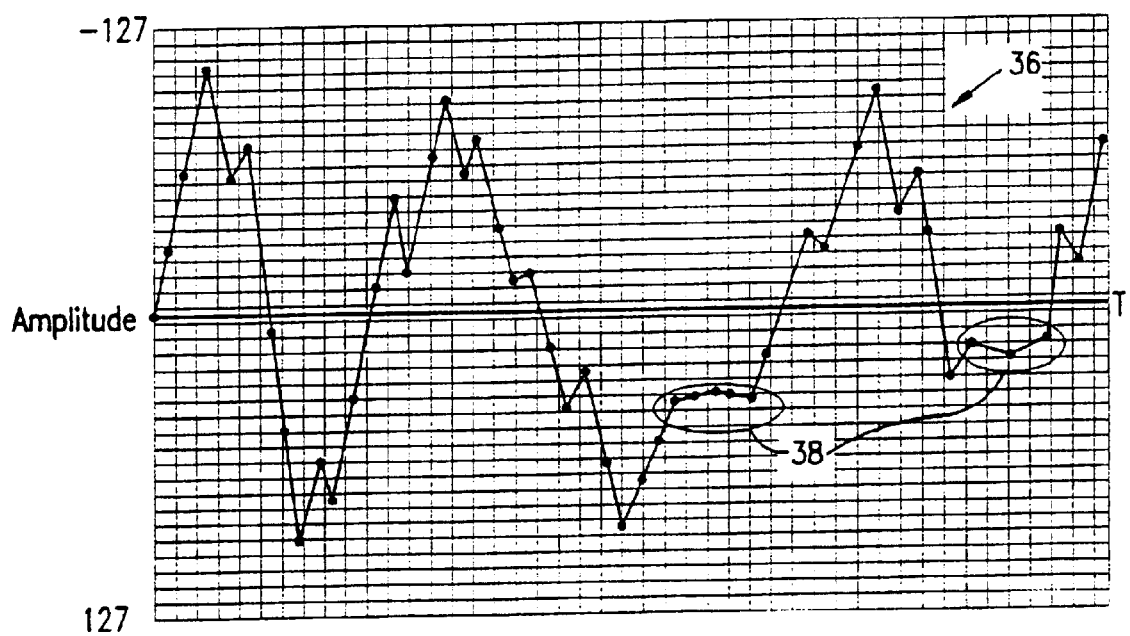
FIG. 3 is a graphic illustration of a voice segment including a number of plateaus.

FIG. 3 is a graphic illustration of a voice segment 36, including a number of plateaus 38. In Appendix A, plateaus are termed "jumps".

The system of the present invention typically operates in one of two modes:

a. Calibration—building a profile of the subject's truth/neutral emotional state by monitoring a subject while the subject is not lying and/or is in a neutral emotional state.

b. Testing—Comparing a subject's speech to the profile of the subject's truth/neutral emotional state as established during calibration, in order to establish emotional state and/or whether or not the subject is being truthful.

If the system is to be used in calibration mode, the method proceeds from step 50 to step 60. If the system is to be used in testing mode, the method proceeds from step 50 to step 80.

Step 60: If step 60 is reached, this indicates that the current segment has been processed for calibration purposes. Therefore, the thorn and plateau information derived in step 40 is stored in a calibration table.

The processes of steps 20–50 are termed herein "voice recording entering processes". If there are more voice recordings to be entered for calibration purposes, the method returns to step 20. If entry of all voice recordings for calibration purposes has been completed (step 70), the method proceeds to step 80.

Step 80: Build profile of truth/neutral emotional state for the subject who is currently being tested. This completes operation in calibration mode. Subsequently, the system enters testing mode in which the subject's voice recordings are compared to his truth/neutral emotional profile in order to identify instances of falsehood or heightened emotion. The subject's profile typically reflects central tendencies of the thorn/plateau information and is typically adjusted to take into account artifacts of the calibration situation. For example, due to natural stress at the beginning of the calibration process, the initial voice recordings may be less reliable than subsequent voice recordings. Preferably, to obtain a reliable indication of central tendencies, extreme entries in the calibration table may be discarded.

Steps 90 onward pertain to the testing mode.

Step 90: Compare thorn/plateau information of current segment to the truth/neutral emotion profile computed in step 80.

Step 100: Threshold the results of the comparison process of step 90 in order to categorize the current segment as being indicative of various emotions and/or of falsehood.

Step 105: Optionally, compensate for carryover. The term "carryover" refers to a residual emotional state carrying over from an "actual" emotional state occasioned by a first perceived situation, wherein the residual emotional state lingers after the first perceived situation has already terminated. An example of a suitable implementation for step 105 is described herein in the flowchart of FIG. 8.

Step 110: Display a message indicating the category determined in step 100.

Step 120: If there are additional segments of voice to be analyzed, return to step 20. Otherwise, quit. Any suitable number m of segments may be used for calibration such as 5 segments.

Figure 4:
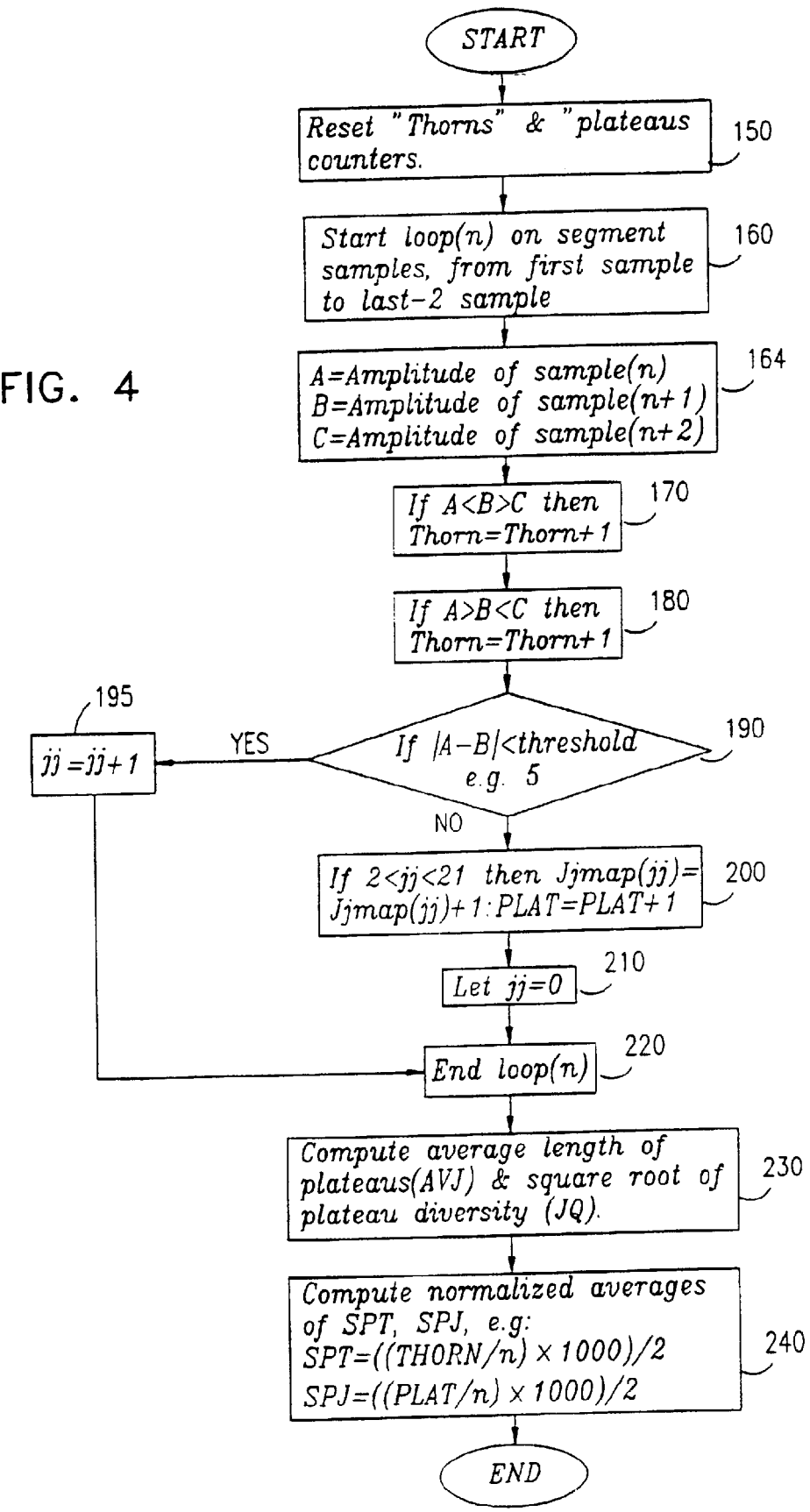
FIG. 4 is a simplified flowchart illustration of a preferred method for performing step 40 of FIG. 1B.

FIG. 4 is a simplified flowchart illustration of a preferred method for performing step 40 of FIG. 1B. As described above, in step 40, thorn/plateau information is generated for the crucial portion of a current voice recording segment.

The current length of the plateau is termed "jj".

"Jjmap(jj)" is the number of plateaus whose length is exactly jj.

"Plat" is the counter counting the number of plateaus regardless of length.

"Thorn" is the counter counting the number of thorns.

n is the number of samples in a crucial portion under test.

In step 150, the thorn and plateau counters are reset.

In step 160, start loop on all crucial portion samples. The loop is started at the first crucial sample and terminates at the last crucial sample minus 2.

In step 164 the amplitudes of the samples in the loop are recorded.

In steps 170 and 180 the thorns are detected, and in steps 190, 195, 200 and 210 the plateaus are detected.

In step 200, if the length of the candidate plateau is between reasonable bounds, such as between 3 and 20, increment the number of plateaus of length jj and increment Plat, the total number of plateaus. Otherwise, i.e. if the length of the candidate plateau is less than 3 or more than 20, the candidate plateau is not considered a plateau.

Whether or not the candidate plateau is deemed a "real" plateau, the plateau length, jj, is zeroed (step 210).

Step 220 is the end of the loop, i.e. the point at which all samples in the sequence have been checked.

In step 230, compute the average (AVJ) and standard error (JQ) of the plateau length variable, jjmap.

In step 240, compute SPT and SPJ. SPT is the average number of thorns per sample, preferably suitably normalized. SPJ is the average number of plateaus per sample, preferably suitably normalized.

According to the illustrated embodiment, emotional status detection is multi-dimensional, i.e. emotional status is derived from the speech information via a plurality of preferably independent intermediate variables.

Figure 5:
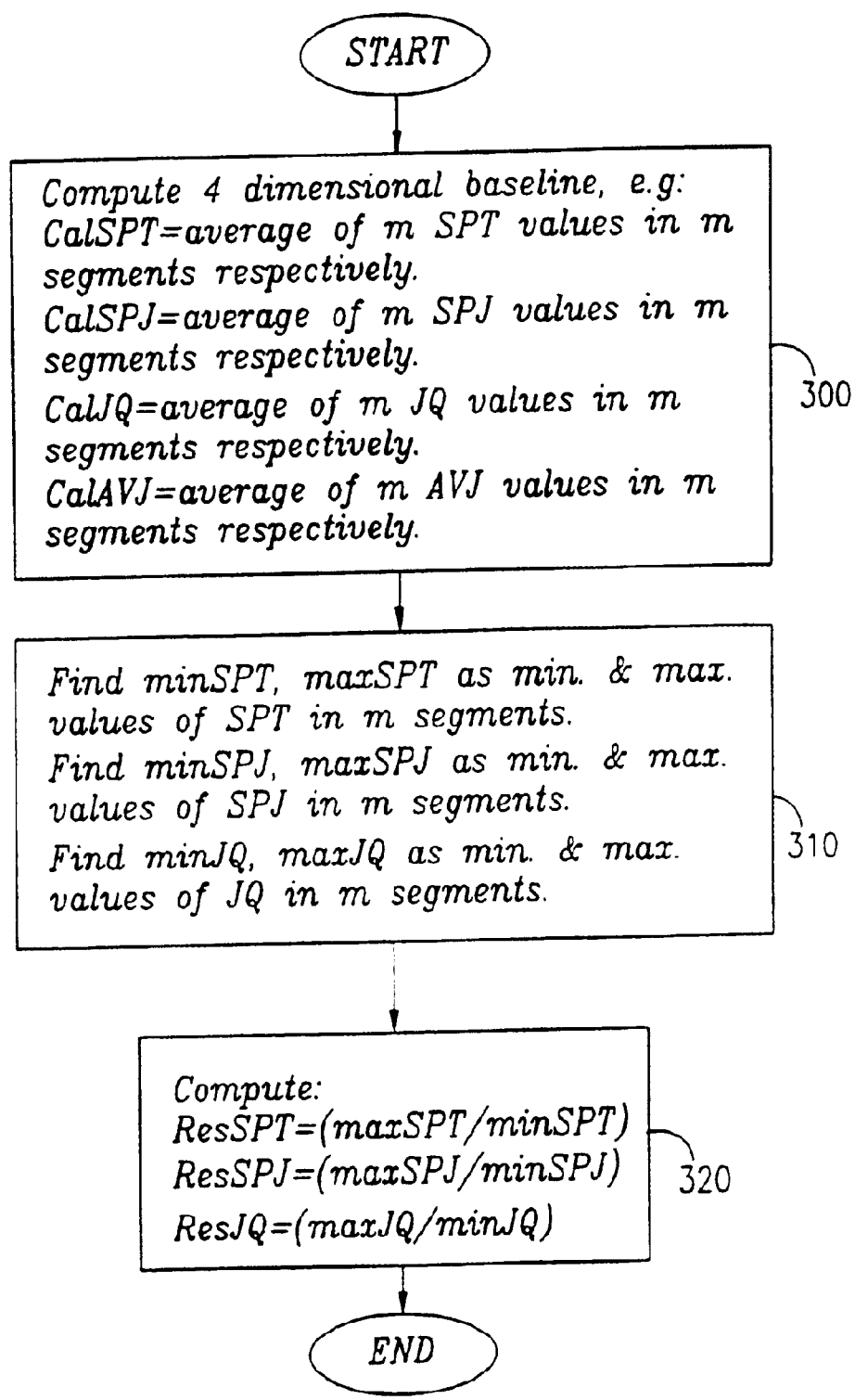
FIG. 5 is a simplified flowchart illustration of a preferred method for implementing the truth/neutral emotion profile building step of FIG. 1B.

FIG. 5 is a simplified flowchart illustration of a preferred method for implementing the truth/neutral emotion profile building step of FIG. 1B.

In FIG. 5, SPT(i) is the SPT value for segment i.

MinSPT is the minimum SPT value measured in any of the m segments.

MaxSPT is the maximum SPT value measured in any of the m segments.

MinSPJ is the minimum SPJ value measured in any of the m segments.

MaxSPJ is the maximum SPJ value measured in any of the m segments.

MinJQ is the minimum JQ value measured in any of the m segments.

MaxJQ is the maximum JQ value measured in any of the m segments.

ResSPT is the size of the range of SPT values encountered during calibration. More generally, ResSPT may comprise any suitable indication of the extent of variation in the number of thorns which may be expected, when the subject is in a truth/neutral emotional state. Therefore, if the number of thorns in a speech segment is non-normative, with relation to ResSPT, then the subject can be said to be in a nonneutral emotional state such as an emotional state characterized by excitation or even arousal. ResSPT is, therefore, typically an input to the process of evaluation of SPT values generated during unknown emotional circumstances.

ResSPJ is the size of the range of SPJ values encountered during calibration. More generally, ResSPJ may comprise any suitable indication of the extent of variation in the number of plateaus which may be expected, when the subject is in a truth/neutral emotional state. Therefore, if the number of plateaus in a speech segment is non-normative, with relation to ResSPJ, then the subject can be said to be in a nonneutral emotional state, such as an emotional state characterized by a feeling of internal contradiction or cognitive dissonance. ResSPJ is, therefore, typically an input to the process of evaluation of SPJ values generated during unknown emotional circumstances.

ResJQ is the size of the range of JQ values encountered during calibration which serves as a baseline value for evaluation of JQ values generated during unknown emotional circumstances.

It is appreciated that the baseline need not necessarily be a 4-dimensional baseline as shown in FIG. 5 but may alternatively be even one-dimensional or may have many more than 4 dimensions.

Figure 6:
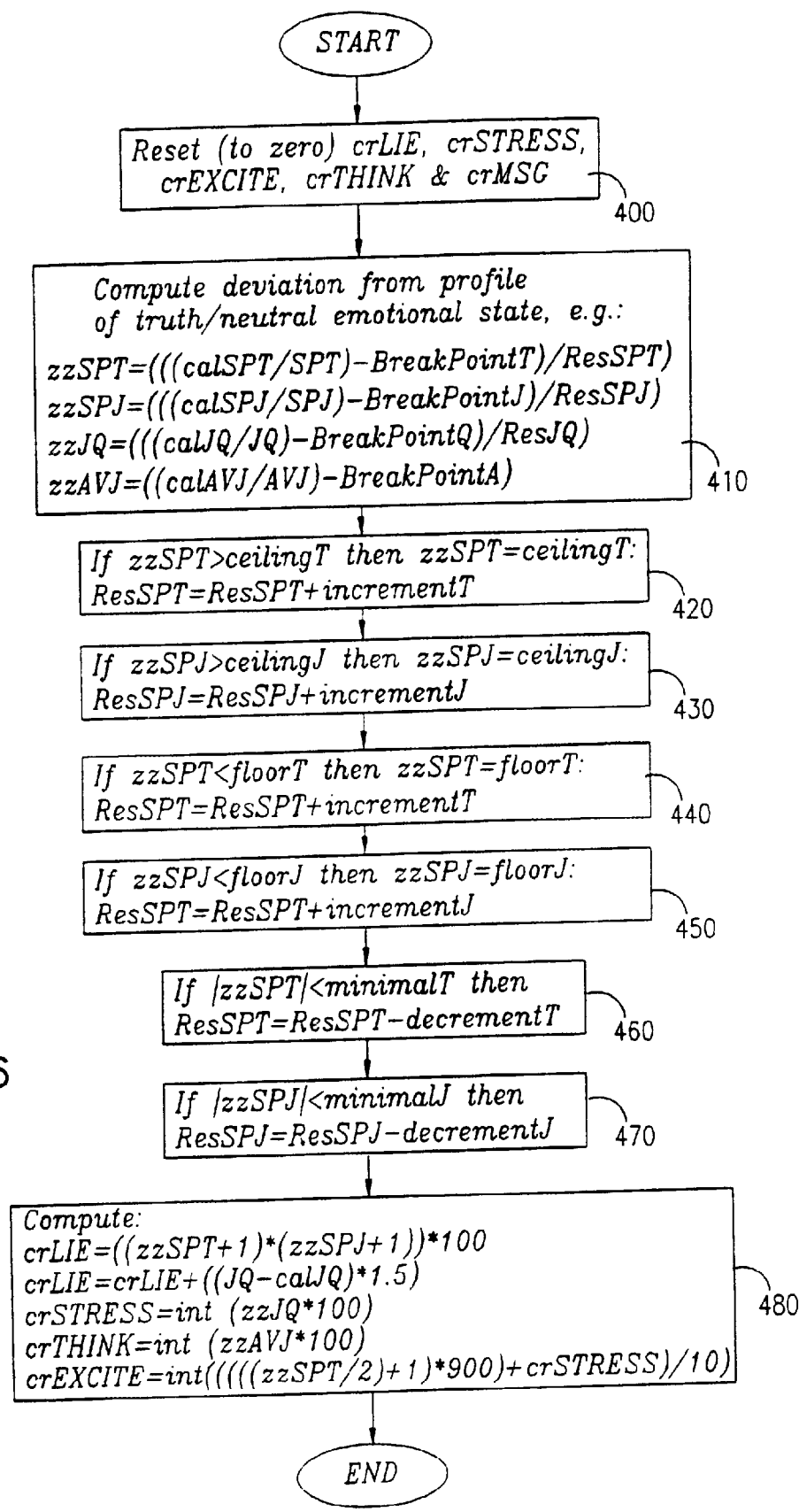
FIG. 6 is a simplified flowchart illustration of a preferred method for performing step 90 of FIG. 1B on a particular segment.

FIG. 6 is a simplified flowchart illustration of a preferred method for performing step 90 of FIG. 1B on a particular segment. As described above, in step 90, thorn/plateau information of a current segment is compared to the truth/neutral emotion baseline computed in step 80.

Step 400 is an initialization step.

Step 410 computes the deviation of a current crucial portion from the subject's previously computed truth/neutral emotional state profile. In the illustrated embodiment, the deviation comprises a four-dimensional value including a first component related to the number of thorns, a second component related to the number of plateaus, a third component related to the standard error in the plateau length and a fourth component related to average plateau length. However, it is appreciated that different components may be employed in different applications. For example, in some applications, the distribution of thorns (uniform, erratic, etc.) over a time interval may be useful in deriving information regarding the subject's emotional state.

"Breakpoint$_T$" is a threshold value characterizing the acceptable range of ratios between average number of thorns in truth/neutral emotional circumstances, and the particular number of thorns in the current crucial portion.

"Breakpoint$_J$" is a threshold value characterizing the acceptable range of ratios between average number of plateaus in truth/neutral emotional circumstances, and the particular number of plateaus in the current crucial portion.

"Breakpoint$_Q$" is a threshold value characterizing the acceptable range of ratios between average standard error of the number of plateaus in truth/neutral emotional circumstances, and the particular standard error in the number of plateaus in the current crucial portion.

"Breakpoint$_A$" is a threshold value characterizing the acceptable range of ratios between average plateau length in truth/neutral emotional circumstances, and the particular average plateau length in the current crucial portion.

Steps 420–470 update the subject's profile to take into account the new information garnered from the current segment. In the illustrated embodiment, only the ResSPT and ResSPJ values are updated, and only if the deviation of a current crucial portion from the subject's previously computed truth/neutral emotional state profile is either very large (e.g. exceeds predetermined ceiling values) or very small (e.g. falls below certain typically negative predetermined floor values). If the deviation of the current crucial portion from the truth/neutral profile is neither very large nor very small (e.g. falls between the ceiling and floor values), the subject's profile is typically left unaltered at this stage.

In steps 460 and 470, if zzSPT and zzSPJ, respectively, are very close to zero, then the system's sensitivity is increased by decrementing ResSPT and ResSPJ respectively.

Step 480 generates suitable, typically application-specific combinations of the deviation components computed in step 410. These combinations are used as a basis for suitable emotional classification criteria, such as the emotional classification criteria specified in FIG. 7. The emotional classification criteria of FIG. 7 determine whether or not to classify the subject as exaggerating, as being untruthful, as being evasive, as being confused or unsure, as being excited, or as being sarcastic. However, it is appreciated that different emotional classifications may be employed in different situations.

In the illustrated embodiment, the SPT information is mainly used to determine the excitement level. More specifically zzSPT is used to determine the value of crEXCITE, which may also depend on additional parameters as crSTRESS. For example a crEXCITE value of between 70 and 120 may be deemed normal, whereas values of between 120 and 160 may be deemed indicative of medium excitement and values exceeding 160 may be deemed indicative of high level excitement.

In the illustrated embodiment, the SPJ information is mainly used to determine feelings of psychological dissonance. For example, a zzSPJ value of between 0.6 and 1.2 may be deemed normal, whereas a value of between 1.2 and 1.7 may be deemed indicative of confusion or uncertainty. A value exceeding 1.7 may be deemed indicative of awareness of voice on the part of the subject, and/or of an attempt of the subject to control his voice.

In the illustrated embodiment, the zzJQ and crSTRESS values are mainly used to determine the stress level. For example, a crSTRESS value of between 70 and 120 may be deemed normal, whereas values of over 120 may be deemed indicative of high stress.

In the illustrated embodiment, the AVJ information is used to determine the amount of thought invested in spoken words or sentences. For example, if crTHINK exceeds a value of 100 then the amount of thought invested in a last sentence spoken is higher than the amount of thought invested in the calibration phase. This means that the person is thinking more about what he is saying than he did in the calibration phase. If the value is less than 100 the person is thinking less about what he is saying than he did in the calibration phase.

In the illustrated embodiment the crLIE parameter is used to determine truthfulness. A crLIE value to 50 may be deemed indicative of untruthfulness, values of between 50 and 60 may be deemed indicative of sarcasm or humor, values of between 60 and 130 may be deemed indicative of truthfulness, values of between 130 and 170 may be deemed indicative of inaccuracy or exaggeration, and values exceeding 170 may be deemed indicative of untruthfulness.

Referring back to FIG. 6, the parameters mentioned above may receive the following values:

Breakpoint$_T$=Breakpoint$_J$=Breakpoint$_Q$=Breakpoint$_A$=1.1

Ceiling$_T$=Ceiling$_J$=1.1

Floor$_J$=Floor$_T$=−0.6.

Increment$_T$=Increment$_J$=Decrement$_T$=Decrement$_J$=0.1

Minimal$_T$=Minimal$_J$=0.1

It is appreciated that all of the numerical values are merely examples and are typically application-dependent.

Figure 7:
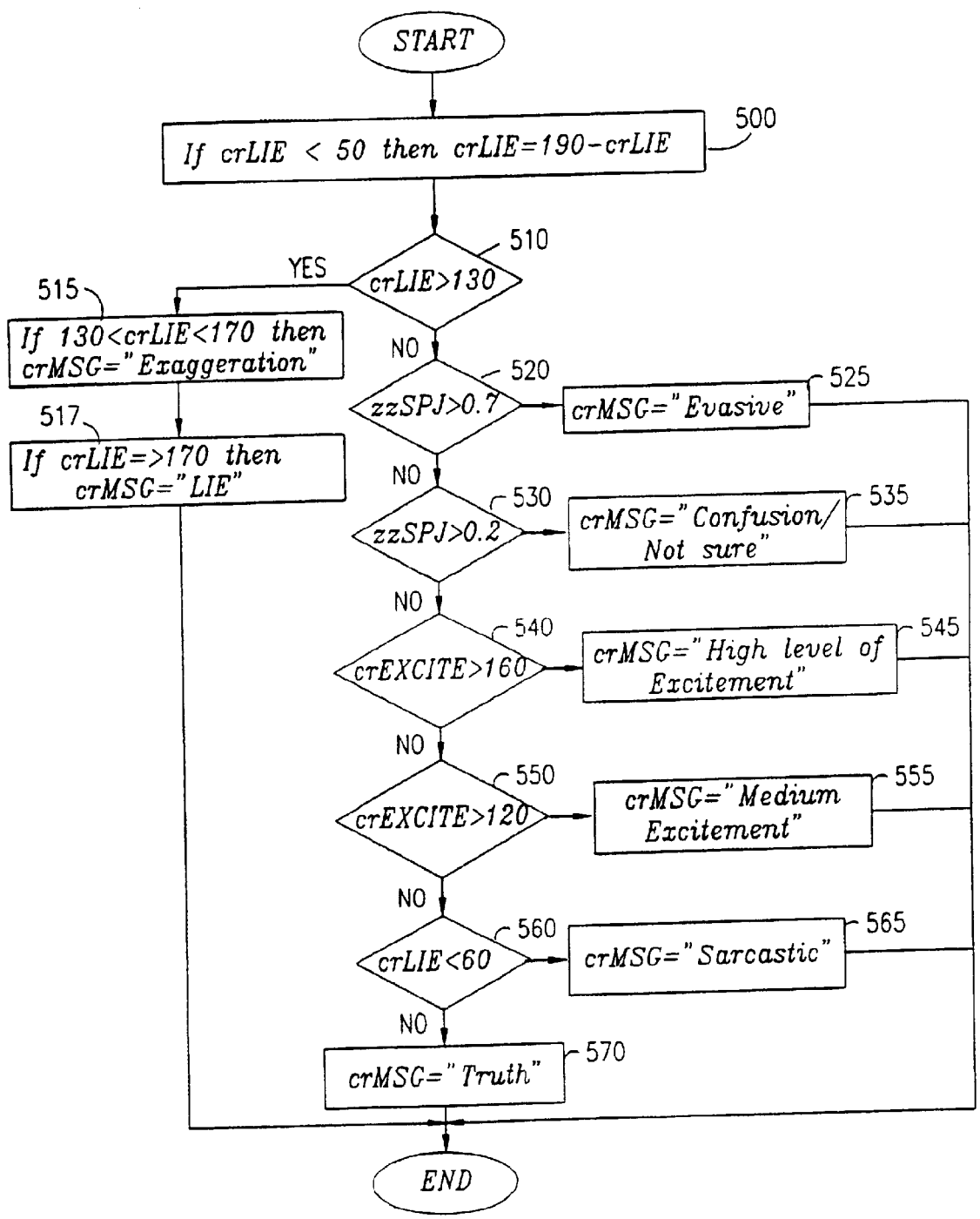
FIG. 7 is a simplified flowchart illustration of a preferred method for performing step 100 of FIG. 1B.

FIG. 7 illustrates the method for converting the various parameters in to messages which may be displayed, as shown for example in FIG. 1.

Figure 8:
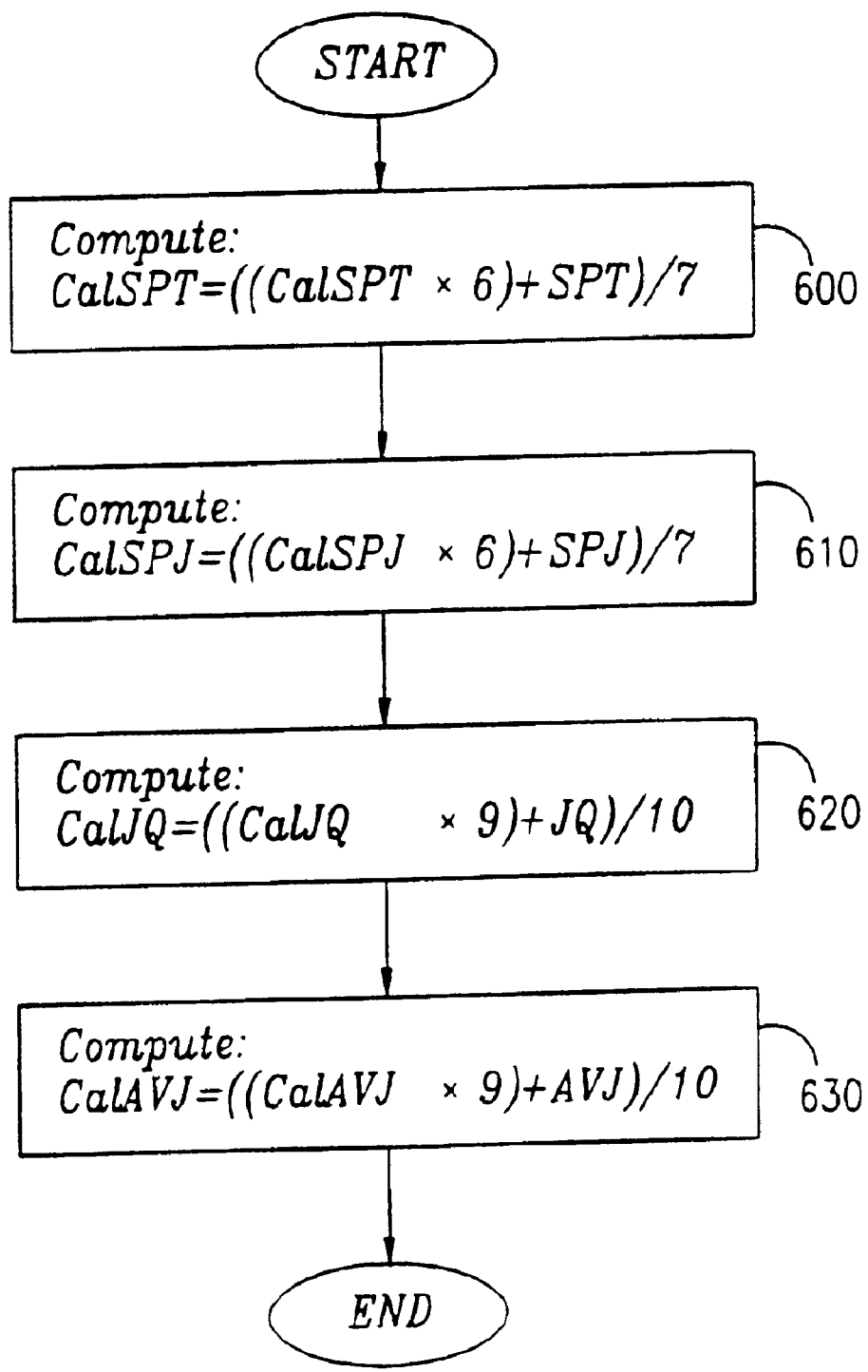
FIG. 8 is a simplified flowchart illustration of a preferred method for performing step 105 of FIG. 1B.

FIG. 8 represents a method for fine tuning the truth/neutral emotional state.

Appendix A is a computer listing of a software implementation of a preferred embodiment of the invention shown and described herein which differs slightly from the embodiment shown and described herein with reference to the drawings.

A suitable method for generating the software implementation is as follows:

a. On a PC equipped with a microphone, a sound card and Visual Basic™ Version 5 software, generate a new project.

The recording setting of the sound card may operate in accordance with the following parameters: 11 KHz, 8 bit, mono, PCM.

b. Place a timer object on the default form which appears in the new project. The timer object is called "timer 1".

c. Place an MCI multimedia control object on the form. This object is called "mmcontrol 1".

d. Place 5 label objects on the form. These labels are called label1, label2, label3, label4 and label6.

e. Create 4 label arrays on the form. Rename the arrays as follows: SPT(0..4), SPJ(0..4), JQ (0..4), AVJ(0..4).

f. Place a command button on the form and change its caption property to end. The command button is called "command 1".

g. Generate code for the form by keying in the pages of Appendix A which are headed "form 1".

h. Add a module to the project. Generate code for the module by keying in the pages of Appendix A which are headed "Feelings_detector".

i. Connect a microphone to the PC.

j. Press (F5) or "run" in order to start the application.

Figure 9:
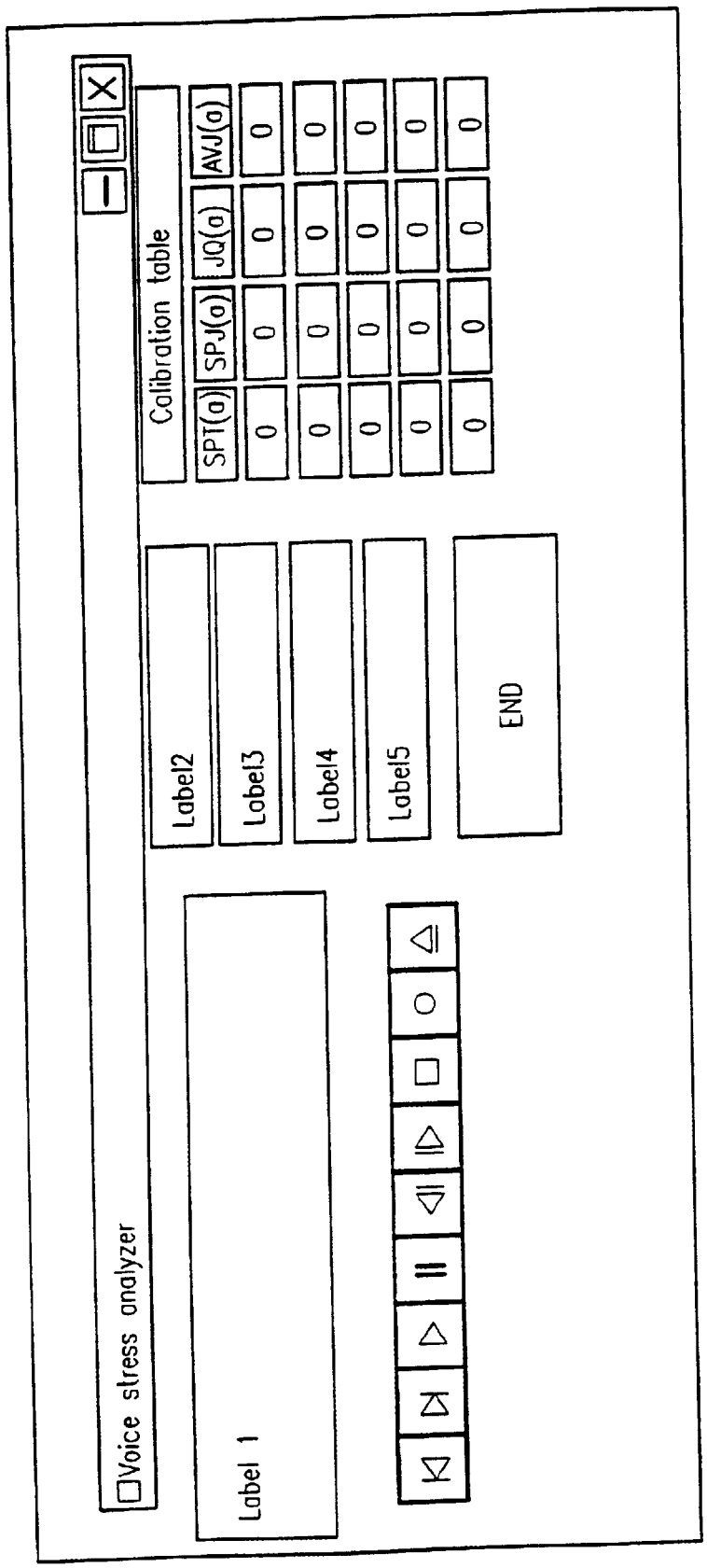
FIG. 9 is a pictorial illustration of a screen display depicting the form, in design mode, just before starting the application of Appendix A.

FIG. 9 is a pictorial illustration of a screen display depicting the form, in design mode, just before starting the application.

Figure 10:
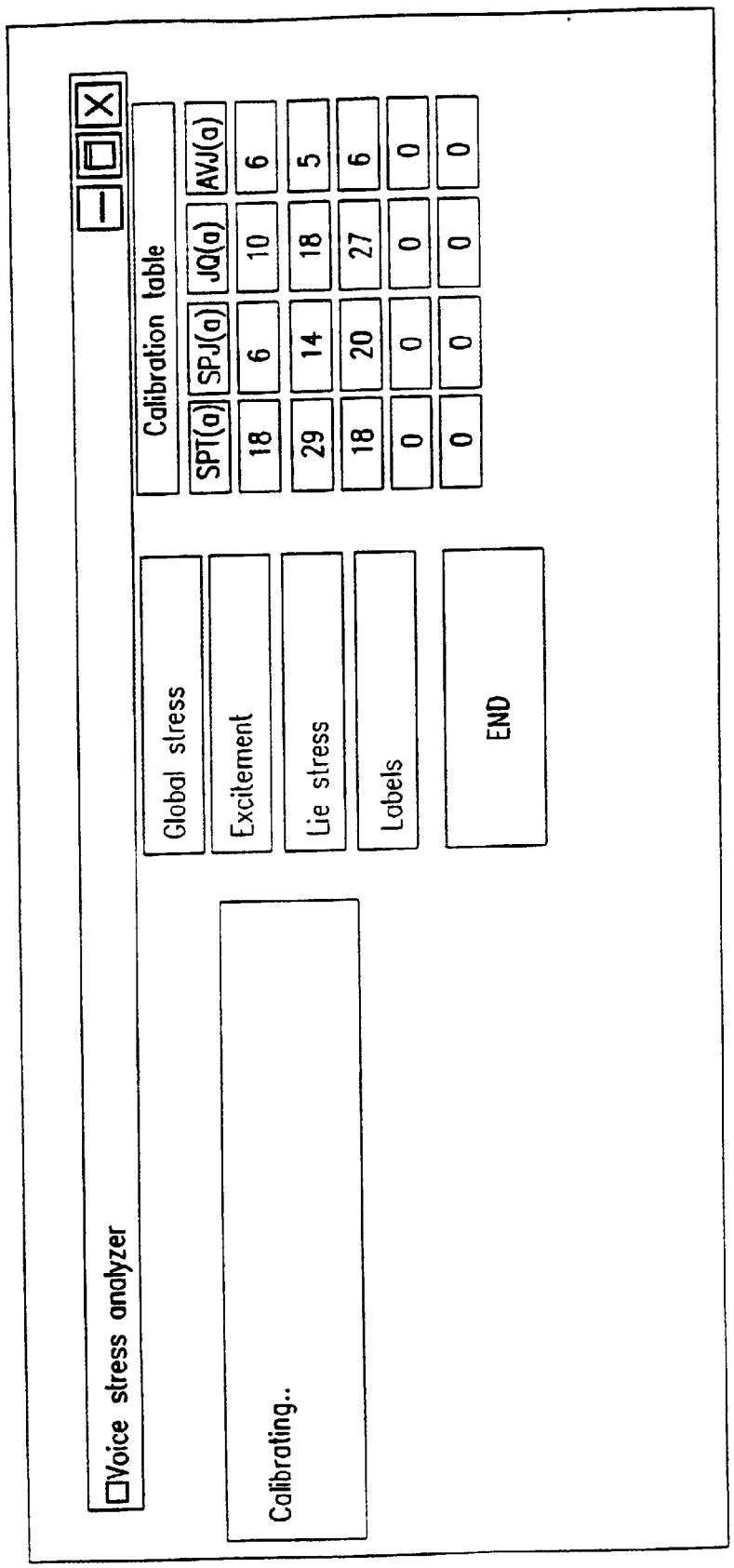
FIG. 10 is a pictorial illustration of a screen display depicting the form, in the run mode of the system of Appendix A, during calibration to a particular subject.

FIG. 10 is a pictorial illustration of a screen display depicting the form, in run mode, during calibration to a particular subject.

Figure 11:
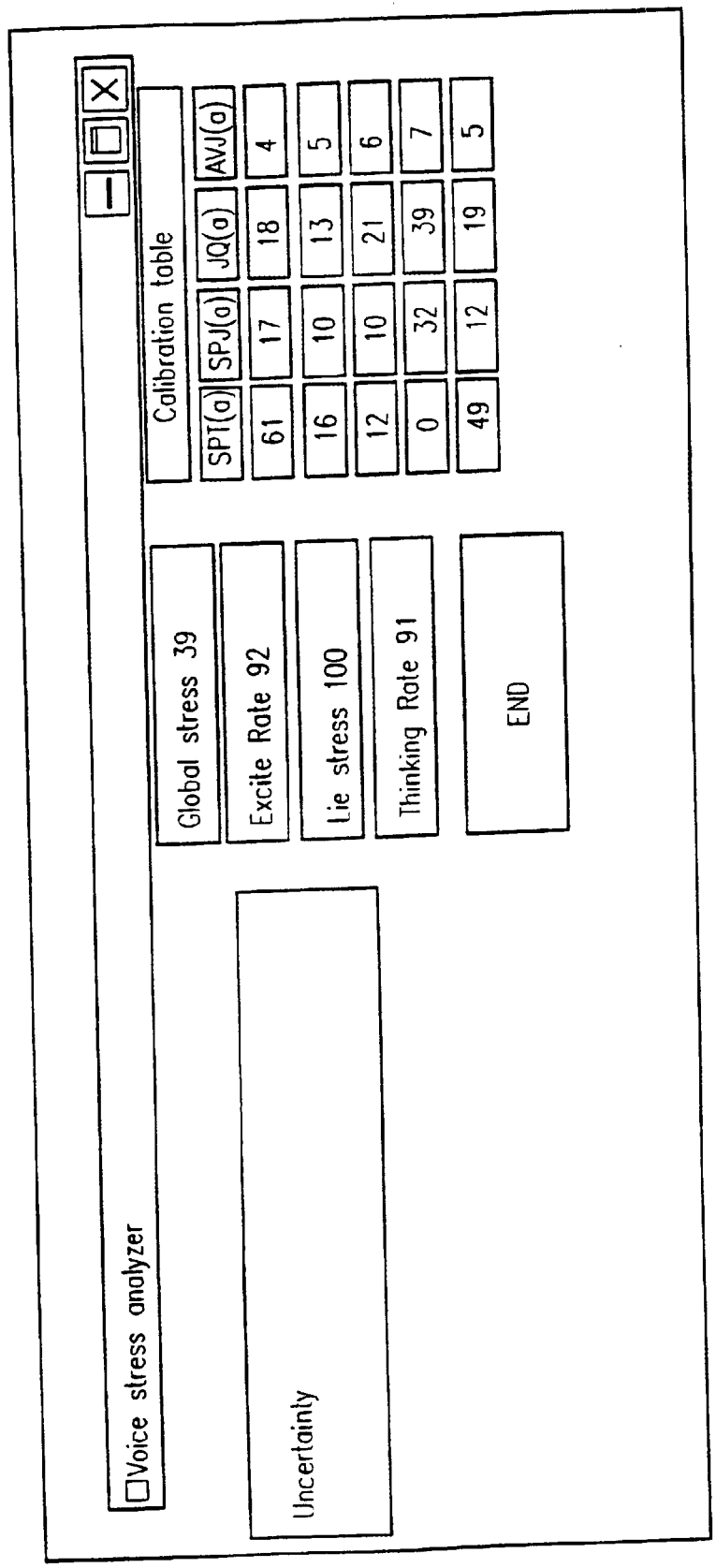
FIG. 11 is a pictorial illustration of a screen display depicting the form, in the run mode of the system of Appendix A, during testing of a subject.

FIG. 11 is a pictorial illustration of a screen display depicting the form, in run mode, during testing of a subject.

The values of the CoR_msgX variable in Appendix A are as follows:

1—truthfulness, 2—sarcasm, 3—excitement, 4—confuision/uncertainty, 5—high excitement, 6—voice manipulation, 7—lie/ false statement, 8—exaggeration/inaccuracy.

Variables carrying data of the current crucial portion have names which begin with the following characters: cor_.

Baseline factors have names which begin with the following characters:

cal_.

Breakpoint factors have names which begin with the following characters:

bp_.

ResSPT and resSPJ are called ResT and ResJ respectively.

Figure 12:
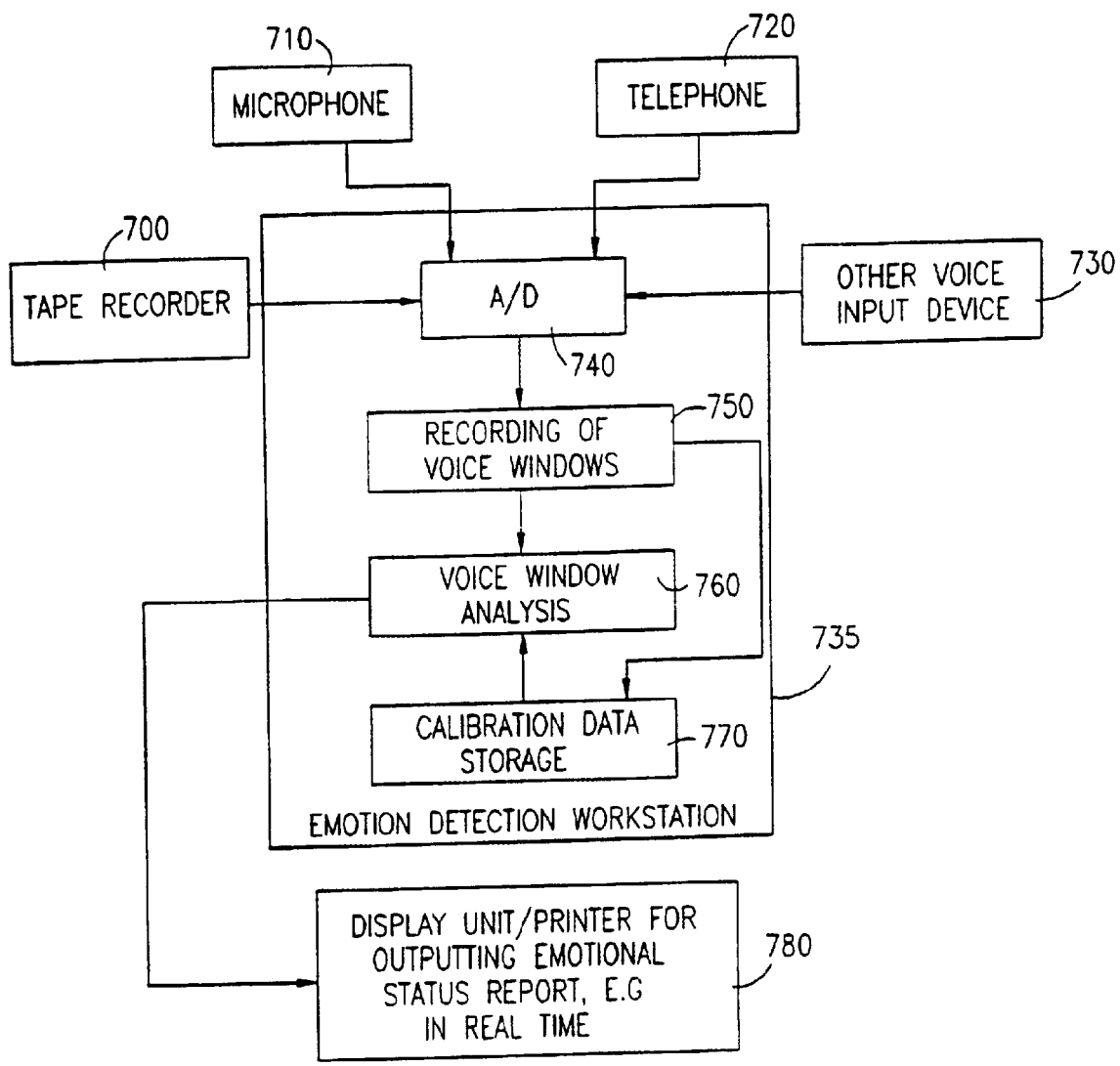
FIG. 12 is a simplified block diagram illustration of a preferred system for performing the method of FIG. 1B.

FIG. 12 is a simplified functional block diagram illustration of a system for detecting emotional states which is constructed and operative in accordance with a preferred embodiment of the present invention and which is operative to perform the method of FIG. 1B. As shown, the system of FIG. 12 includes a voice input device such as a tape recorder 700, microphone 710 or telephone 720 which generates speech which is input by an emotion detection workstation 735 via an A/D converter 740. A voice window recorder 750 typically partitions the incoming speech-representing signals into voice windows or segments which are analyzed by a voice window analyzer 760. The voice window analyzer compares the voice windows or segments to calibration data stored in unit 770. The calibration data is typically derived individually for each individual subject, as described in detail above. A display unit or printer 780 is provided for displaying or printing an emotional status report, preferably on-line, for the user of the system.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendix is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

WO 99/31653                                          PCT/IL98/00613

APPENDIX A

*The following code should be written on the form object:*

Form1

Private Sub Command1_Click()
End
End Sub

Private Sub Form_Load()
' Set properties needed by MCI to open.
a = mciSendString("setaudio waveaudio algorithm pcm bitspersample to 8 _
        bytespersec to 11025 input volume to 100 source to avarage", 0, 0, 0)

MMControl1.Notify = False
MMControl1.Wait = True
MMControl1.Shareable = False
MMControl1.DeviceType = "WaveAudio"
MMControl1.filename = "C:\buf.WAV"

' Open the MCI WaveAudio device.
MMControl1.Command = "Open"

' Define constants
   CR_BGlevel = 15      ' Background level barrier
   CR_BGfilter = 3      ' Vocal wave smoother
   CR_DATAstr = ""      ' Reset Data String
   CR_mode = 1
   CONS_SARK = 50
   CONS_LIE11 = 130: CONS_LIE12 = 175
   CONS_LowzzT = -0.4: CONS_HighzzT = 0.3
   CONS_LowzzJ = 0.2: CONS_HighzzJ = 0.7
   CONS_RES_SPT = 2: CONS_RES_SPJ = 2

CONS_BGfiler = 3

' Set timer object to work every 0.5 sec
Timer1.Interval = 500
Timer1.Enabled = True ' set display
Label1.Caption = "System decision"
Label2.Caption = "Global stress:"
Label3.Caption = "Excitement:"
Label4.Caption = "Lie stress:"
MMControl1.Visible = False End Sub Private Sub Timer1_Timer()
Static been
On Error Resume Next MMControl1.Command = "stop"
MMControl1.Command = "save"
MMControl1.Command = "close"
' read data from file
ff = MMControl1.filename
Dim kk As String * 6500
kk = Space(6500)
Open ff For Binary Access Read As #1
Get #1, 50, kk
Close #1
Kill ff
MMControl1.Command = "open"

a = MMControl1.ErrorMessage

MMControl1.Command = "record"

```
CR_DATAstr = kk
If OP_stat = 0 Then
    OP_stat = 1     ' first round or after recalibration demand
    been = 0
    End If
If been < 5 Then
    Label1.Caption = "Calibrating.."
    Call Calibrate    ' Perform calibration
    ' get calibration status by CR_msgX
    If CoR_msgX > -1 Then  ' good sample
        been = been + 1
        End If
    Exit Sub
    Else
    OP_stat = 2  ' Checking status
    Call CHECK
    ' get segment status by CR_msgX
    End If
If CoR_msgX < 0 Then Exit Sub ' not enogh good samples Label4.Caption = "Lie stress.:" + Format(Int(CR_LIE))
Label2.Caption = "Global stress:" + Format(Int(CR_STRESS))
Label3.Caption = "Excite Rate:" + Format(Int(CR_EXCITE))
Label6.Caption = "Thinking Rate:" + Format(Int(CR_THINK))

been = been + 1
Select Case CoR_msgX
```

```
    Case 0
       ans = "background noise"
    Case 1
       ans = "TRUE"
    Case 2
       ans = "Outsmart"
    Case 3
       ans = "Excitement"
    Case 4
       ans = "Uncertainty "
    Case 5
       ans = "High excitement"
    Case 6
       ans = "Voice manipulation / Avoidance / Emphasizing"
    Case 7
       ans = "LIE"
    Case 8
       ans = "Inaccuracy "
    End Select
    Label1.Caption = ans End Sub Sub Calibrate()

Call CUT_sec
If CR_noSMP < 800 Then
   ' no samples
      CoR_msgX = -1
      Exit Sub
      End If
```

```
' Scan thorns
CONS_RES_SPT = 2
CONS_RES_SPJ = 2

Call scan_TJ
If Int(CoR_spT) = 0 Or Int(CoR_AVjump) = 0 Or Int(CoR_QJUMP) = 0 Or
Int(CoR_SPJ) = 0 Then
    CoR_msgX = -1
    Exit Sub
    End If tot_T = 0: tot_J = 0: tot_JQ = 0: tot_avj = 0
minspT = 1000: minspJ = 1000: minJQ = 1000
For a = 0 To 4
If SPT(a).Caption = 0 And SPJ(a).Caption = 0 Then
    SPT(a).Caption = Int(CoR_spT)
    SPJ(a).Caption = Int(CoR_SPJ)
    JQ(a).Caption = Int(CoR_QJUMP)
    AVJ(a).Caption = Int(CoR_AVjump)
    Exit For
    End If
tot_T = tot_T + SPT(a)
tot_J = tot_J + SPJ(a)
tot_JQ = tot_JQ + JQ(a)
tot_avj = tot_avj + AVJ(a)
If Val(SPT(a).Caption) < minspT Then minspT = Val(SPT(a).Caption)
If Val(SPT(a).Caption) > maxspT Then maxspT = Val(SPT(a).Caption)
If Val(SPJ(a).Caption) < minspJ Then minspJ = Val(SPJ(a).Caption)
If Val(SPJ(a).Caption) > maxspJ Then maxspJ = Val(SPJ(a).Caption)
If Val(JQ(a).Caption) < minJQ Then minJQ = Val(JQ(a).Caption)
```

If Val(JQ(a).Caption) > maxJQ Then maxJQ = Val(JQ(a).Caption)
Next a

'calc current CAL factors
CAL_spT = (tot_T + Int(CoR_spT)) / (a + 1)
CAL_spJ = (tot_J + Int(CoR_SPJ)) / (a + 1)
CAL_JQ = (tot_JQ + Int(CoR_QJUMP)) / (a + 1)
CAL_AVJ = (tot_avj + Int(CoR_AVjump)) / (a + 1)

' calc resolution per factor
On Error Resume Next
If a > 1 Then
  res_T = maxspT / minspT
  res_J = maxspJ / minspJ
  End If
 CoR_msgX = 0
End Sub Sub CHECK()

Call CUT_sec
If CR_noSMP < 800 Then
   ' no samples
      CoR_msgX = -1
      Exit Sub
      End If

CONS_RES_SPT = 2
CONS_RES_SPJ = 2

Call scan_TJ

```
If Int(CoR_spT) = 0 Or Int(CoR_AVjump) = 0 Or Int(CoR_QJUMP) = 0 Or
Int(CoR_SPJ) = 0 Then
    CoR_msgX = -1
    Exit Sub
End If Call analyze
Call decision ' Fine tune cal factors
CAL_spT = ((CAL_spT * 6) + CoR_spT) \ 7
CAL_spJ = ((CAL_spJ * 6) + CoR_SPJ) \ 7
CAL_JQ = ((CAL_JQ * 9) + CoR_QJUMP) \ 10
CAL_AVJ = ((CAL_AVJ * 9) + CoR_AVjump) / 10
End Sub
```

*The following code should be written in a new Module object:*
Feelings_detector

*'Declaration section*
Global Fname '- file name
*Global CR_BGfilter '- BackGround Filter*
Global CR_BGlevel ' - BackGround level
Global CR_DATAstr
Global CR_noSMP '- nomber of samples
Global res_J, res_T
Global CoR_spT, CoR_SPJ, CoR_AVjump, CoR_QJUMP
Global CoR_msgX, CR_retDATAstr
Global SMP(10000) As Integer Global OP_stat
' ** Calibration factors
Global CAL_spJ, CAL_spT
Global CAL_JQ, CAL_AVJ
Global BP_J, BP_T '- CALIBRATION break points
Global WI_J, WI_T, WI_JQ '- Wigth of factors in calc.
Global CR_zzT, CR_zzJ
Global CR_STRESS, CR_LIE, CR_EXCITE, CR_THINK
Global CR_RESfilter ' -resolution filter
' Constants for decision
Global CONS_SARK
Global CONS_LIE11, CONS_LIE12
Global CONS_LowzzT, CONS_HighzzT
Global CONS_LowzzJ, CONS_HighzzJ
Global CONS_RES_SPT, CONS_RES_SPJ Declare Function mciSendString Lib "winmm.dll" Alias "mciSendStringA" (ByVal lpstrCommand As String, ByVal lpstrReturnString As String, ByVal uReturnLength As Long, ByVal hwndCallback As Long) As Long Sub analyze()
On Error Resume Next
    CR_LIE = 0
    CR_STRESS = 0
    CR_EXCITE = 0

If (CoR_spT = 0 And CoR_SPJ = 0) Or CR_noSMP = 0 Then
        CR_msg = "ERROR"
        Exit Sub
    End If

```
If CoR_SPJ = 0 Then CoR_SPJ = 1
If CoR_spT = 0 Then CoR_spT = 1

On Error Resume Next
  rrJ = res_J: rrT = res_T

BP_J = 1.1: BP_T = 1.1 zz_spj = (((CAL_spJ / Int(CoR_SPJ)) - BP_J) / rrJ)
If zz_spj > -0.05 And zz_spj < 0.05 Then res_J = res_J - 0.1
If res_J < 1.3 Then res_J = 1.3
If zz_spj < -0.6 Then
   zz_spj = -0.6
   res_J = res_J + 0.1
   End If
If zz_spj > 1.2 Then
   zz_spj = 1.2
   res_J = res_J + 0.1
   End If
 If res_J > 3.3 Then res_J = 3.3
 CR_zzJ = zz_spj zz_spT = (((CAL_spT / CoR_spT) - BP_T) / rrT)
CR_zzT = zz_spT
If zz_spT > -0.05 And zz_spT < 0.05 Then res_T = res_T - 0.1
If res_T < 1.3 Then res_T = 1.3
If zz_spT < -0.6 Then
   zz_spT = -0.6
   res_T = res_T + 0.1
   End If
If zz_spT > 1.2 Then
```

```
    zz_spT = 1.2
    res_T = res_T + 0.1
    End If
If res_T > 3.3 Then res_T = 3.3

WI_J = 6: WI_T = 4
    CR_STRESS = Int((CoR_QJUMP / CAL_JQ) * 100)
    ggwi = WI_J * WI_T
    CR_LIE = ((zz_spT + 1) * WI_T) * ((zz_spj + 1) * WI_J)
    CR_LIE = ((CR_LIE / ggwi)) * 100
    CR_LIE = CR_LIE + Int((CoR_QJUMP - CAL_JQ) * 1.5)
    CR_THINK = Int((CoR_AVjump / CAL_AVJ) * 100)
    CR_EXCITE = ((((((CR_zzT) / 2) + 1) * 100) * 9) + CR_STRESS) / 10

' ********* END OF Phase 2 - ******
    If CR_LIE > 210 Then CR_LIE = 210
    If CR_EXCITE > 250 Then CR_EXCITE = 250
    If CR_STRESS > 300 Then CR_STRESS = 300
    If CR_LIE < 30 Then CR_LIE = 30
    If CR_EXCITE < 30 Then CR_EXCITE = 30
    If CR_STRESS < 30 Then CR_STRESS = 30
End Sub Sub CUT_sec()

CR_noSMP = 0
    If CR_DATAstr = "" Then
        CR_msg = "ERROR! - No data provided"
        Exit Sub
    End If
    CR_AUTOvol = 1    ' Auto amplifier
```

```
CoR_volume = 3    ' default
CR_minSMP = 800 ' default
free = FreeFile

' Break CR_DATAstr to bytes
LocA = 1: LocB = 1
BGAmin = 0
BGAmax = 0
MAXvolume = 0
TestP = 0
BR_LOW = -128
BR_high = -128
ddd = -128
ddd = Int(ddd * (CoR_volume / 3))
ddd = (ddd \ CR_BGfilter) * CR_BGfilter
If CR_AUTOvol = 1 Then
    ' apply auto volume detect
    MAXvolume = 0
    For a = 1 To Len(CR_DATAstr)
    ccc = Asc(Mid$(CR_DATAstr, a, 1))
    ccc = ccc - 128
    ccc = (ccc \ CR_BGfilter) * CR_BGfilter
    If (ccc > CR_BGlevel Or ccc < 0 - CR_BGlevel) And ccc > ddd Then
        If Abs(ccc) > MAXvolume Then MAXvolume = Abs(ccc)
        If StartPos = 0 Then StartPos = a
        OKsmp = OKsmp + 1
        End If
    If MAXvolume > 110 Then Exit For
    Next a
    If OKsmp < 10 Then
        CR_msg = "Not enough samples !"
```

```
        CR_noSMP = 0
        Exit Sub
     End If
   CoR_volume = Int(360 / MAXvolume)
   If CoR_volume > 16 Then CoR_volume = 3
   End If On Error Resume Next
   drect = "": DR_flag = 0
   MAXvolume = 0
   LocA = 0
   Done = 0
89 For a = StartPos To Len(CR_DATAstr) - 1
   ccc = Asc(Mid$(CR_DATAstr, a, 1)): ccd = Asc(Mid$(CR_DATAstr, a + 1, 1))
   ccc = ccc - 128: ccd = ccd - 128
   ccc = Int(ccc * (CoR_volume / 3))
   ccd = Int(ccd * (CoR_volume / 3))
   ccc = (ccc \ CR_BGfilter) * CR_BGfilter
   ccd = (ccd \ CR_BGfilter) * CR_BGfilter If (ccc > CR_BGlevel Or ccc < 0 - CR_BGlevel) And ccc > ddd Then
      If Abs(ccc) > MAXvolume Then MAXvolume = Abs(ccc)
      fl = fl + 1
      End If
   If fl > 5 Then
      SMP(LocA) = ccc
      If BR_high < ccc Then BR_high = ccc
      If BR_LOW > ccc Or BR_LOW = -128 Then BR_LOW = ccc
      If (SMP(LocA) > 0 - CR_BGlevel And SMP(LocA) < CR_BGlevel) Or
SMP(LocA) = ddd Then
         blnk = blnk + 1
```

```
        Else
            blnk = 0
        End If
     If blnk > 1000 Then
         LocA = LocA - 700
         Done = 1
         If LocA > CR_minSMP Then Exit For
         Done = 0
         LocA = 0
         fl = 2: blnk = 0
         BR_LOW = -128: BR_high = -128
         End If
      LocA = LocA + 1
      End If
   Next a
   Err = 0

CR_noSMP = LocA
   If CR_noSMP < CR_minSMP Then
      CR_msg = "Not enough samples !"
      Exit Sub
      End If CR_msg = "Completed O.K."
End Sub Sub decision()

If CR_zzT = 0 And CR_zzJ = 0 And (CL_spJ <> Int(CoR_SPJ)) Then
    CR_msg = "ERROR! - Required parameters missing !"
    Exit Sub
```

```
        End If
If CR_STRESS = 0 Or CR_LIE = 0 Or CR_EXCITE = 0 Then
    CR_msg = "ERROR! - Required calculations missing !"
    Exit Sub
    End If CR_msgCode = 0
    CoR_msgX = 0
    sark = 0

If CR_LIE < 60 Then
    CoR_msgX = 2
    Exit Sub
    End If

5555 If ((CR_zzJ + 1) * 100) < 65 Then
        If ((CR_zzJ + 1) * 100) < 50 Then sark = 1
        CR_zzJ = 0.1
        End If
    If ((CR_zzT + 1) * 100) < 65 Then
        If ((CR_zzT + 1) * 100) < CONS_SARK Then sark = sark + 1
        CR_zzT = 0.1
        End If LIE_BORD1 = CONS_LIE11: LIE_BORD2 = CONS_LIE12
    If CR_LIE < LIE_BORD1 And CR_STRESS < LIE_BORD1 Then
        CR_msgCode = CR_msgCode + 1
        End If
    If CR_LIE > LIE_BORD1 And CR_LIE < LIE_BORD2 Then
        CoR_msgX = 8
        Exit Sub
```

```
    End If

If CR_LIE > LIE_BORD2 Then
    If CR_msgCode < 128 Then CR_msgCode = CR_msgCode + 128
End If If CR_zzJ > CONS_LowzzJ Then
    If CR_zzJ > CONS_HighzzJ Then
        CR_msgCode = CR_msgCode + 64
    Else
        CR_msgCode = CR_msgCode + 8
    End If
End If If CR_EXCITE > LIE_BORD1 Then
    If CR_EXCITE > LIE_BORD2 Then
        If (CR_msgCode And 32) = False Then CR_msgCode = CR_msgCode + 32
    Else
        If (CR_msgCode And 4) = False Then CR_msgCode = CR_msgCode + 4
    End If
End If If CR_msgCode < 3 Then
    If sark = 2 Then
        CR_msgCode = -2
        CoR_msgX = 2
        Exit Sub
    End If
    If sark = 1 Then
        If (CR_zzT > CONS_LowzzT And CR_zzT < CONS_HighzzT) Then
            CR_msgCode = -1
```

```
        CoR_msgX = 2
    Else
        If CR_zzT > CONS_HighzzT Then CoR_msgX = 7
    End If
    If (CR_zzJ > CONS_LowzzT And CR_zzJ < CONS_HighzzT) Then
        CR_msgCode = -1
        CoR_msgX = 2
    Else
        If CR_zzJ > CONS_HighzzT Then CoR_msgX = 7
    End If
    Exit Sub
    End If
    CR_msgCode = 1
    CoR_msgX = 1
    Exit Sub
End If If CR_msgCode > 127 Then
    CoR_msgX = 7
    Exit Sub
End If
If CR_msgCode > 67 Then
    CoR_msgX = 8
    Exit Sub
End If
If CR_msgCode > 63 Then
    CoR_msgX = 6
    Exit Sub
End If
If CR_msgCode > 31 Then
    CoR_msgX = 5
```

```
        Exit Sub
    End If
    If CR_msgCode > 7 Then
        CoR_msgX = 4
        Exit Sub
    End If
    If CR_msgCode > 3 Then
        CoR_msgX = 3
        Exit Sub
    End If
    CoR_msgX = 1
End Sub Sub scan_TJ()
    ReDim jjump(100)
    CR_msg = ""
    TestP = CR_noSMP
    CR_spT = 0
    CR_SPJ = 0
    If TestP <= 0 Then
        CR_msg = "No. of samples not transmitted !"
        Exit Sub
    End If
    CR_minJUMP = 3 ' default
    CR_maxJUMP = 20 ' default jump = 0
    thorns = 0
    BIGthorns = 0
    For a = 1 To CR_noSMP
    jjt1 = SMP(a): jjt2 = SMP(a + 1): jjt3 = SMP(a + 2)
```

```
' scan thorns
If (jjt1 < jjt2 And jjt2 > jjt3) Then
    If jjt1 > 15 And jjt2 > 15 And jjt3 > 15 Then thorns = thorns + 1
    End If
If (jjt1 > jjt2 And jjt2 < jjt3) Then
    If jjt1 < -15 And jjt2 < -15 And jjt3 < -15 Then thorns = thorns + 1
    End If If (jjt1 > jjt2 - 5) And (jjt1 < jjt2 + 5) And (jjt3 > jjt2 - 5) And (jjt3 < jjt2 + 5) Then
    sss = sss + 1
    Else
    If sss >= CR_minJUMP And sss <= CR_maxJUMP Then
        jump = jump + 1
        jjump(sss) = jjump(sss) + 1
        End If
    sss = 0
    End If
Next a AVjump = 0
JUMPtot = 0
CR_QJUMP = 0

For a = 1 To 100
JUMPtot = JUMPtot + jjump(a)
AVjump = AVjump + (jjump(a) * a)
Next a
If JUMPtot > 0 Then cr_AVjump = AVjump / JUMPtot
For a = 1 To 100
    If jjump(a) > 1 Then QJUMP = QJUMP + ((jjump(a) * Abs(cr_AVjump - a))) ' *
jjump(a))
```

Next a

CoR_spT = (Int(((thorns) / CR_noSMP) * 1000) / CONS_RES_SPT)
CoR_SPJ = (Int(((jump) / CR_noSMP) * 1000) / CONS_RES_SPJ)
CoR_QJUMP = Sqr(QJUMP)
CoR_AVjump = cr_AVjump CR_msg = "Thorns & Jumps scan completed O.K"
End Sub

What is claimed is:

1. A method for detecting emotional status of an individual, the method comprising:
   receiving a speech specimen generated by the individual and deriving therefrom intonation information; and
   generating an output indication of the individual's emotional status based on said intonation information,
   wherein said intonation information includes the number of thorns in at least a portion of the speech specimen and wherein said generating step comprises of computing the individual's excitement level in a current crucial portion defined within at least one current segment based on said number of thorns and generating an output indication of said excitement level,
   wherein said intonation information also comprises lengths of plateaus within said portion,
   and wherein said excitement level comprises a decreasing function of (a) the number of thorns in at least a portion of the speech specimen and of (b) the diversity of plateau length within said portion,
   wherein said excitement level in said crucial portion is computed as a Sum of (a) a function of a ratio between calSPT and an SPT value of said current segment and of (b) a function of a ratio between calJQ and a JQ value of the current segment;
   calSPT signifying an average of m SPT values in m respective calibration segments, m signifying a number of segments of a subject's voice recording which are used for calibration in which a profile of truth/neutral emotional state is built for the subject,
   each SPT value comprising a function of a ratio between a number of thorns detected in an individual crucial portion of a segment and the number of samples n included in the individual crucial portion,
   calJQ signifying an average of m JQ values in m respective calibration segments; and
   each JQ value signifying a square root of plateau diversity in an individual crucial portion of a segment.

2. A method according the claim 1 wherein said speech specimen is provided over a telephone.

3. A method according to claim 1 wherein said output indication of the individual's emotional status includes a lie detection report based on the individual's emotional status.

4. A method according to claim 1 wherein said intonation information comprises multidimensional intonation information.

5. A method according to claim 4 wherein said multidimensional information comprises at least 3-dimensional information.

6. A method according to claim 5 wherein said multidimensional information comprises at least 4-dimensional information.

7. A method according to claim 1 wherein said information relating to thorns comprises the number of thorns in a predetermined time period.

8. A method according to claim 7 wherein said information relating to thorns comprises the distribution of thorns over time.

9. A method according to claim 1 wherein said intonation information includes information relating to plateaus.

10. A method according to claim 9 wherein said information relating to plateaus comprises the number of plateaus in a predetermined time period.

11. A method according to claim 1 wherein said information relating to length of plateaus comprises an average plateau length for a predetermined time period.

12. A method according to claim 1 wherein said information relating to length of plateaus comprises the standard error of plateau length for a predetermined-time period.

13. A method according to claim 1 wherein said speech specimen comprises a main speech wave having a period and wherein said receiving step comprises analyzing the speech specimen in order to determine rate of occurrence of plateaus, each plateau indicating that a local low-frequency wave is super-imposed onto the main speech wave; and
   wherein the generating step comprises providing a suitable output indication based on the rate of occurrence of plateaus.

14. A method according to claim 1 wherein:
   said step of receiving comprises quantifying a plurality of characteristics of a speech specimen generated by the individual; and
   said step of generating comprises generating a lie detection output indication, based on said plurality of quantified characteristics.

15. A method according to claim 1 wherein:
   said step of receiving comprises establishing a multi-dimensional characteristic range characterizing an individual's range of emotion when at rest by:
      monitoring the individual for a plurality of emotion-related parameters, over a first period during which the individual is in an emotionally neutral state; and
      defining the characteristic range as a function of the range of the emotionrelated parameters during said first period; and
   wherein said step of generating comprises monitoring the individual for said emotion-related parameters, over a second period during which it is desired to detect the individual's emotional status, thereby to obtain a measurement of said plurality of emotion-related parameters, and adjusting said measurement to take into account said range.

16. A method for detecting emotional status of an individual, the method comprising:
   receiving a speech specimen generated by the individual and deriving therefrom intonation information; and
   generating an output indication of the individual's emotional status based on said intonation information,
   wherein said generating step comprises computing the individual's excitement level in a current crucial portion defined within at least one current segment and generating an output indication of said excitement level,
   wherein said excitement level in said crucial portion is computed as a sum of (a) a function of a ratio between calSPT and an SPT value of said current segment and of (b) a function of a ratio between caljQ and a JQ value of the current segment;
   calSPT signifying an average of m SPT values in m respective calibration segments, m signifying a number of segments of a subject's voice recording which are used for calibration in which a profile of truth/neutral emotional state is built for the subject,
   each SPT value comprising a function of a ratio between a number of thorns detected in an individual crucial portion of a segment and the number of samples n included in the individual crucial portion;
   calJQ signifying an average of m JQ values in m respective calibration segments; and
   each JQ value signifying a square root of plateau diversity in an individual crucial portion of a segment.

* * * * *

UNITED STATES PATENT AND TRADEMARK OFFICE
CERTIFICATE OF CORRECTION

PATENT NO. : 6,638,217 B1
DATED : October 28, 2003
INVENTOR(S) : Amir Liberman

It is certified that error appears in the above-identified patent and that said Letters Patent is hereby corrected as shown below:

Column 10,
Line 13, please delete "v,1-20/2."
Line 23, after "step comprises" please delete "of."
Line 35, after "computed as a" please delete "Sum," and insert -- sum -- in its place.
Line 47, after "individual crucial" please delete "portion," and insert -- portion; -- in its place.
Line 52, after "A method according" please insert -- to --.

Column 11,
Line 14, after "length fo a" please delete "predetermined-time" and insert -- predetermined time -- in its place.
Line 38, after "range of the" please delete "emotionrelated" and insert -- emotion-related -- in its place.

Column 12,
Line 23, after "a ration between" please delete "caljQ" and insert -- caljQ -- in its place.

Signed and Sealed this

Twenty-third Day of March, 2004

JON W. DUDAS
*Acting Director of the United States Patent and Trademark Office*